United States Patent
Kamigauchi (12)

(10) Patent No.: US 8,329,076 B2
(45) Date of Patent: Dec. 11, 2012

(54) METHOD OF OPERATING INJECTION MOLDING MACHINE AND INJECTION MOLDING MACHINE

(75) Inventor: Yuji Kamigauchi, Hiroshima (JP)

(73) Assignee: The Japan Steel Works, Ltd., Tokyo (JP)

( * ) Notice: Subject to any disclaimer, the term of this patent is extended or adjusted under 35 U.S.C. 154(b) by 162 days.

(21) Appl. No.: 12/820,793

(22) Filed: Jun. 22, 2010

(65) Prior Publication Data

US 2010/0320633 A1 Dec. 23, 2010

(30) Foreign Application Priority Data

Jun. 23, 2009 (JP) ................................. 2009-148171

(51) Int. Cl.
*B29C 45/72* (2006.01)
*B29C 45/78* (2006.01)

(52) U.S. Cl. .................. 264/40.6; 264/328.14; 425/144; 425/548; 425/551

(58) Field of Classification Search ................ 264/40.6, 264/328.14–328.16; 425/143, 144, 547–552
See application file for complete search history.

(56) References Cited

U.S. PATENT DOCUMENTS

| 4,573,897 A * | 3/1986 | Piazzola ........................ 425/143 |
| 2003/0082265 A1 | 5/2003 | Bauer et al. |
| 2007/0063061 A1* | 3/2007 | Nagasaka ................... 236/68 B |
| 2009/0142439 A1 | 6/2009 | Cooke |

FOREIGN PATENT DOCUMENTS

| DE | 31 37 998 A1 | 3/1983 |
| DE | 3137998 | * 3/1983 |
| DE | 20 2009 003 331 U1 | 7/2009 |
| JP | 5-253993 A | 10/1993 |
| JP | 9-262885 A | 10/1997 |
| JP | 2002-273771 A | 9/2002 |
| JP | 2008-246940 A | 10/2008 |

OTHER PUBLICATIONS

Extended European Search Report issued in Application No. 10166734.3, dated Oct. 27, 2010.

* cited by examiner

*Primary Examiner* — Jill Heitbrink
(74) *Attorney, Agent, or Firm* — Sughrue Mion, PLLC

(57) ABSTRACT

In an injection molding machine, dies are connected to a die temperature regulating machine by means of thermal medium supplying pipes and thermal medium returning pipes. A heat exchanger is interposed between the thermal medium returning pipes. The air which has been heated by the heat exchanger is supplied to a hopper through a hot air supplying pipe so as to preheat and dry injection material in the hopper.

6 Claims, 2 Drawing Sheets

METHOD OF OPERATING INJECTION MOLDING MACHINE AND INJECTION MOLDING MACHINE

This application claims priority from Japanese patent Application No. 2009-148171 filed on Jun. 23, 2009, the entire subject-matter of which is incorporated herein by reference.

BACKGROUND OF THE INVENTION

1. Field of the Invention

The present invention relates to a method of operating an injection molding machine including an injection cylinder for plasticizing injection material and a die to be filled with the injection material which has been plasticized by the injection cylinder, in which the injection material which has been preheated is supplied to the injection cylinder by a predetermined amount thereby to plasticize the material, and also relates to the injection molding machine.

2. Description of the Related Art

An injection molding machine includes an injection device and a die device. The injection device includes an injection cylinder, a screw which is provided in the injection cylinder so as to be driven in a rotary direction and in an axial direction, and a hopper for supplying injection material into the injection cylinder. When the injection material is supplied from the hopper to the injection cylinder by a predetermined amount while the screw is driven to rotate, the injection material is subjected to both frictional force and shearing action, and generates heat. Moreover, a heater is provided on an outer periphery of the injection cylinder, and therefore, the injection material is molten with the heat transmitted from the injection cylinder, and the heat generated by the friction, shearing action and so on, and then, accumulated in a measuring room in a distal end part of the injection cylinder.

On the other hand, the die device includes a fixed side die which is attached to a fixed platen, a movable die which is attached to a movable platen and is adapted to be clamped or opened with respect to the fixed platen, and a die clamping device for clamping the movable platen with respect to the fixed platen. Moreover, a cavity for imparting a shape to a molded product is formed on a die mating face, that is, a parting face between the movable side die and the fixed side die. Further, the die device is provided with a die temperature regulating machine.

Therefore, the injection material in a molten state having high temperature which has been measured, as described above, is injected to be filled in the cavity of the die which has been clamped by driving the screw in the axial direction. Then, by opening the movable side die, after the injection material has been cooled and solidified, the molded product is obtained. On this occasion, for the purpose of shortening a molding cycle, the die filled with the injection material having the high temperature is cooled with thermal medium which is supplied to and discharged from the die temperature regulating machine.

JP-A-2002-273771 discloses such an injection molding die that temperature of the die can be regulated. Specifically, there is shown the die which can be controlled by die temperature regulating means, so that temperature of a cavity of the die before it is filled with the injection resin may become higher near an inlet of the molten resin and become lower at a deep side. In this document, there is no description concerning utilization of heat of thermal medium which has become high temperature after it has cooled the molten resin.

JP-A-2008-246940 discloses an injection molding machine which is provided with a clean booth chamber so as to surround a die part, for the purpose of preventing contamination of a molded product. An air supply unit for blowing out clean air is provided in the clean booth chamber. Moreover, the clean booth chamber is open to the exterior through a delivery port for delivering the molded product from the clean booth chamber to the exterior, and a through hole which a fixed platen passes through. The air having high temperature in the clean booth chamber flows out from the through hole. Then, the flowing air having the high temperature is circulated to the air supply unit.

JP-A-H05-253993 discloses a heat recovery device provided with a space for supplying and discharging regenerative material, which is formed in at least one of a fixed side die and a movable side die. The space is connected to a regenerative material supply tank and a regenerative material storage tank which are provided outside the die, by means of respective pipes. Therefore, when the regenerative material is supplied into the space from the regenerative material supply tank, heat is exchanged by way of the dies between the regenerative material and molten resin having high temperature which has been filled. As the results, the temperature of the regenerative material is raised. By storing the regenerative material which has become high temperature, in the regenerative material storage tank, it is possible to utilize the regenerative material for raising the temperature of the dies prior to the injection.

JP-A-H09-262885 discloses an injection molding machine including an injection cylinder in which a screw is provided so as to be driven in a rotary direction and in an axial direction, and a hopper for supplying resin material to the injection cylinder. In the injection molding machine, a plurality of heaters are provided on an outer periphery of the injection cylinder, and a cover having cooling fans at a predetermined interval is provided on outer peripheries of the heaters. An interior of the cover having the cooling fans is formed as a heat recovery chamber. The heat recovery chamber is connected to the hopper by means of a hot air passage.

In the injection molding machine disclosed in JP-A-2008-246940, it seems that the heat exhausted from the die is recovered. However, the hot air leaked from the clean booth chamber is simply returned to the clean booth chamber, and it cannot be said, in the strict sense, that the exhausted heat is recovered. According to the heat recovery device disclosed in JP-A-H05-253993, because the heat is exchanged between the regenerative material in the space and the molten resin having the high temperature by way of the dies, it is recognized that the heat of the molten resin is recovered to the regenerative material, and the exhausted heat is effectively utilized. However, there are various problems in putting the heat recovery device into practice. For example, there is such a problem that cost for the die is increased, because the space must be especially provided inside the die. Moreover, the device cannot be applied to an existing die as it is, because the space must be especially provided inside the die. Further, a position of the space may be restricted depending on a layout of the cavity. Still further, heat exchanging efficiency of the space is low due to its shape. In case where a layout of the space is restricted, the efficiency is further lowered.

According to the injection molding machine disclosed in JP-A-H09-262885, the heat recovery chamber is formed inside the cover having the cooling fans. Because the heat recovery chamber is connected to the hopper by means of the hot air passage, when the outside air is introduced into the heat recovery chamber, by actuating the cooling fans according to necessity, the injection cylinder can be cooled, and the resin material which is contained in the hopper can be preheated and dried with the hot air obtained from the air which has cooled the injection cylinder. As the results, plasticizing performance can be enhanced, and plasticizing operation can be achieved, even though the molding cycle is shortened. However, there still remain those matters to be improved. The reason will be described herein below, referring to a motor-driven injection molding machine, as an example. Table 1 shows distribution of energy which is supplied per one molded product in a certain molding cycle of the motor-driven injection molding machine. As shown in the table 1, about 70% of electric energy is used for plasticizing the resin in a solid state.

TABLE 1

An example of a certain molding cycle
Molding cycle time = 30 sec. Material: PP

| Process | Jkas Plasticizing | Jcyl Cylinder heat radiation | Jmlos Motor | Jalos Amplifier | Jinj Injection | Jhlos Hopper water | Jcont Control | Jmch Mechanical loss |
|---|---|---|---|---|---|---|---|---|
| Energy (J) | 269421 | 45086 | 5462 | 5462 | 24178 | 10500 | 5040 | 9069 |
| Distribution of energy (%) | 72.0 | 12.0 | 1.5 | 1.5 | 6.5 | 2.8 | 1.3 | 2.4 |

Total Energy: 374218 (J)

The molten resin which has been plasticized is injected and filled into the die. Then, after a cooling and solidifying process, the molded product is taken out. The resin in the molten state which has absorbed a large amount of electric power, that is, heat radiates a large amount of heat during the cooling and solidifying process. However, this large amount of heat is not recovered in the injection molding machine disclosed in JP-A-H09-262885. Calculating from data concerning polypropylene in the database of thermal characteristics of plastics, an amount of heat required for heating and melting 1 g of polypropylene at 40° C. to 215° C. is 592.1 J/g, and an amount of heat required for heating and melting 1 g of polypropylene at 50° C. to 215° C. is 539.0 J/g. When it has been preheated to 50° C., energy saving of about 10% is attained. Because a room temperature at a time of general molding is 25° C., energy saving of about 30% is estimated, when it has been preheated by 30° C. However, in the injection molding machine disclosed in JP-A-H09-262885, the heat is recovered from the injection cylinder. In other words, the heat is not recovered from a part where the molten resin is forcibly cooled, and hence, the resin cannot be preheated to such a high temperature as described above. Specifically, in the invention disclosed in JP-A-H09-262885, only the heat which leaks to the exterior from the heaters wound around the outer periphery of the injection cylinder is recovered, but a large amount of heat which is radiated when the molten resin is solidified is not utilized.

SUMMARY OF THE INVENTION

An object of the invention is to provide a method of operating an injection molding machine for effectively utilizing a large amount of heat which is radiated, when injection material in a molten state by absorbing a large amount of energy is solidified, and to provide the injection molding machine. Another object of the invention is to provide the method of operating the injection molding machine and the injecting molding machine which can be easily applied to an existing injection molding machine.

The invention is constructed such that the injection material is preheated, or preheated and dried with recovery heat which has been obtained, through a heat exchanger, from heat of thermal medium which has cooled the injection material and has become high temperature in itself, when the injection material, that is, a molded product filled in the die is cooled with the thermal medium. The thermal medium is supplied to and discharged from the die preferably by a die temperature regulating machine. The heat exchanger is provided in a pipeline for returning the thermal medium from the die, preferably in the pipeline between the die and the die temperature regulating machine. Another invention is constructed such that the injection material which is filled in the die is cooled with air by way of a fixed platen and a movable platen, and the air which has become high temperature in itself preheats the injection material. A still another invention is constructed such that the injection material is preheated with the recovery heat which has been obtained through the heat exchanger and the air which has cooled the injection material by way of the fixed platen and the movable platen. A still another invention is constructed such that a flow rate of the air for cooling the fixed platen and the movable platen is controlled. As the results, temperatures of the fixed platen and the movable platen are stabilized.

According to a first illustrative aspect of the invention, there is provided a method of operating an injection molding machine, the injection molding machine comprising a die and an injection cylinder which plasticizes injection material and fills the die with the injection material, wherein the injection molding machine is operable to preheat the injection material and supply the preheated injection material to the injection cylinder by a predetermined amount to be plasticized, the method comprising: obtaining recovered heat, through a heat exchanger, from heat of thermal medium which has cooled the injection material filled in the die so as to become high temperature; and using the recovered heat for preheating the injection material.

According to a second illustrative aspect of the invention, in the method of operating an injection molding machine, wherein the heat exchanger exchanges heat between the thermal medium for cooling the injection material and air for preheating the injection material.

According to a third illustrative aspect of the invention, in the method of operating an injection molding machine, wherein the die of the injection molding machine comprises a fixed side die attached to a fixed platen and a movable side die attached to a movable platen, and wherein the recovered heat is obtained, through the heat exchanger, from the heat of the thermal medium which has cooled the injection material filled in the die by way of the fixed platen and movable platen so as to become high temperature.

According to a fourth illustrative aspect of the invention, there is provided a method of operating an injection molding machine, the injection molding machine comprising a die and an injection cylinder which plasticizes injection material and fills the die with the injection material, wherein the injection molding machine is operable to preheat the injection material and supply the preheated injection material to the injection cylinder by a predetermined amount to be plasticized, the method comprising: obtaining recovered heat, through a heat exchanger, from heat of thermal medium which has been supplied to the die from a die temperature regulating machine, cooled the injection material filled in the die so as to become high temperature and returned from the die; and using the recovered heat for preheating the injection material.

According to a fifth illustrative aspect of the invention, in the method of operating an injection molding machine, wherein the heat exchanger exchanges heat between the thermal medium for cooling the injection material and air for preheating the injection material.

According to a sixth illustrative aspect of the invention, there is provided a method of operating an injection molding machine, the injection molding machine comprising: a die comprising a fixed side die attached to a fixed platen and a movable side die attached to a movable platen; and an injection cylinder which plasticizes injection material and fills the die with the injection material, wherein the injection molding machine is operable to preheat the injection material and supply the preheated injection material to the injection cylinder by a predetermined amount to be plasticized, the method comprising preheating the injection material by using air which has cooled the injection material filled in the die by way of the fixed platen and the movable platen so as to become high temperature.

According to a seventh illustrative aspect of the invention, the method further comprises: obtaining recovered heat, through a heat exchanger, from heat of thermal medium which has cooled the injection material filled in the die so as to become high temperature; using the air and the recovered heat for preheating the injection material; and controlling a flow rate of the air to stabilize temperatures of the fixed platen and the movable platen.

According to an eighth illustrative aspect of the invention, there is provided an injection molding machine comprising: a die; an injection cylinder which plasticizes injection material and fills the die with the injection material; a thermal medium supplying pipe which supplies a first thermal medium to the die from a die temperature regulating machine; a thermal medium returning pipe which discharges the first thermal medium from the die toward the die temperature regulating machine; a hopper provided to the injection cylinder for containing the injection material; and a heat exchanger provided to the thermal medium returning pipe for exchanging heat between the first thermal medium flowing through the thermal medium returning pipe and a second thermal medium flowing to the hopper for preheating the injection material contained in the hopper, whereby exhausted heat of the first thermal medium which has cooled the injection material filled in the die so as to become high temperature is shifted to the second thermal medium and preheats the injection material in the hopper.

According to a ninth illustrative aspect of the invention, in the injection molding machine, wherein the heat exchanger is provided in the thermal medium returning pipe between the die and the die temperature regulating machine.

As described above, according to the invention, the recovery heat which has been obtained, through the heat exchanger, from the heat of the thermal medium which has cooled the injection material filled in the die is used for preheating the injection material. In other words, a large amount of heat which is radiated, when the molten resin which has absorbed a lot of heat is solidified, is used for preheating the injection material. Therefore, the injection material can be sufficiently preheated and can be plasticized with less energy. Specifically, the heat is recovered from a part of the injection molding machine where the energy is wasted most, and hence, it is advantageously possible to carry out the molding in an energy saving manner. Moreover, although the die of the injection molding machine is generally cooled with the thermal medium, the heat is recovered through the heat exchanger according to the invention. Therefore, it is possible to easily put the invention into practice at a low cost, only by adding the heat exchanger to the existing die. Further, according to the invention in which an air is used as the thermal medium for preheating the injection material, it is possible to exhibit excellent heat responsible performance and to easily deal with the thermal medium.

Moreover, according to the invention in which the thermal medium which has cooled the injection material filled in the die, that is, the molded product by way of the fixed platen and the movable platen and has become high temperature is used for preheating the injection material, it is possible to preheat the injection material in the same manner. In this case, the temperatures of the fixed die and the movable die are lowered, and an amount of deformation by heat is reduced, which advantageously contributes to accurate molding. On this occasion, by controlling a flow rate of the air so that the temperatures of the fixed platen and the movable platen may be stabilized, sacrificing the preheating to some extent, the amount of deformation can be further reduced.

DETAILED DESCRIPTION OF THE PREFERRED EMBODIMENTS

Figure 1:
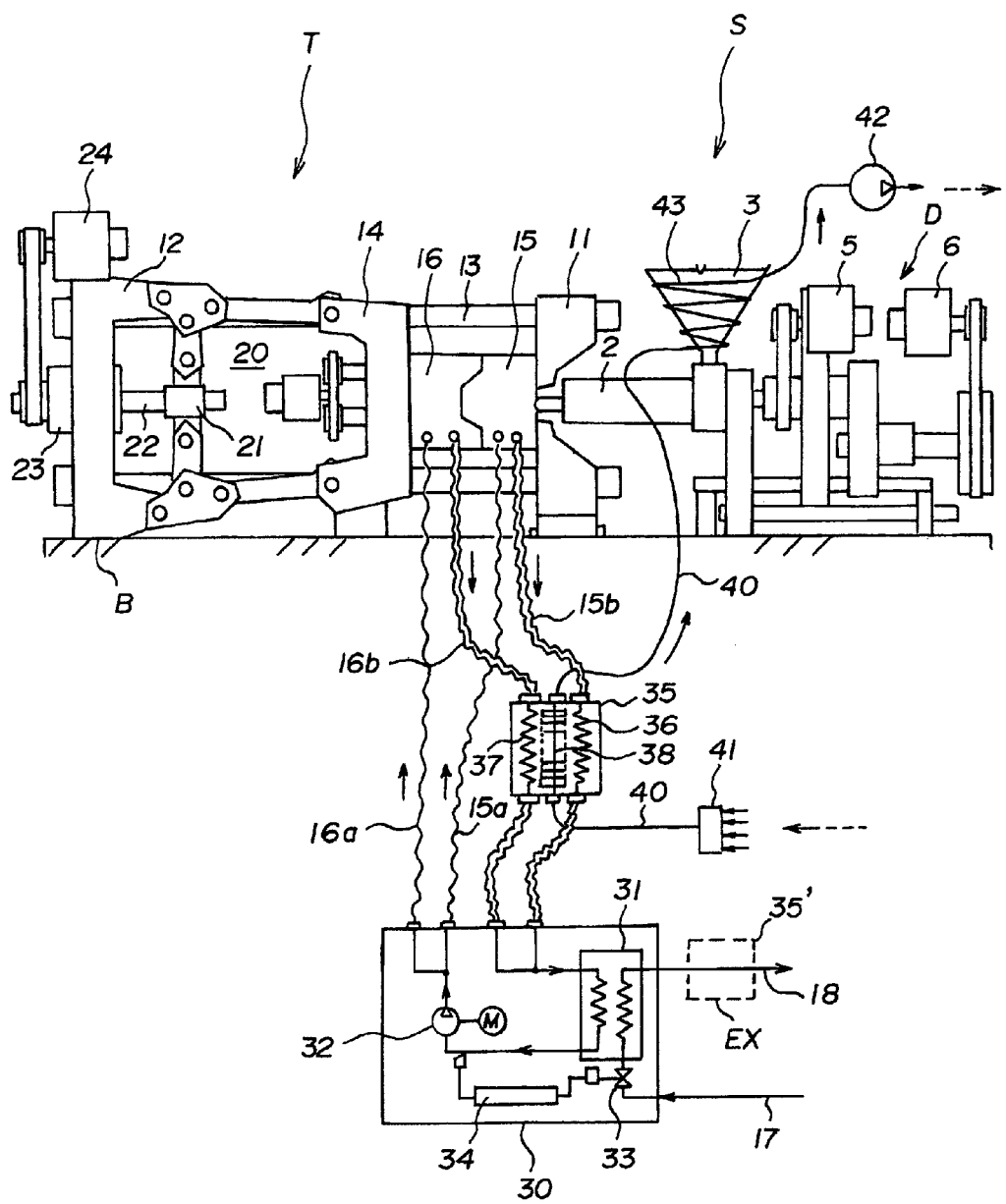
FIG. 1 is a front view showing an injection molding machine according to either a first embodiment or a second embodiment of the invention.

Exemplary embodiments of the invention will now be described with reference to the drawings. One embodiment of the invention is applied to a motor-driven injection molding machine including a toggle type clamping device and uses resin material as the injection material. Incidentally, the invention can be applied to a direct pressure type injection molding machine or use metallic injection material having a low melting point as the injection material. As shown in FIG. 1, the motor-driven injection molding machine according to the embodiment includes an injection device S and a toggle type clamping device T. The injection device S includes an injection cylinder 2, a screw which is provided in the injection cylinder 2 so as to be driven in a rotary direction and in an axial direction, and a hopper 3 which is provided in rear of the injection cylinder 2. Solid resin material in a pellet form is supplied by a predetermined amount from the hopper 3 to the injection cylinder 2. A driving part D for driving the screw is provided with a motor 5 for plasticizing and a motor 6 for injection. Output shafts of these motors are coupled to a screw shaft by way of a reduction mechanism or a spline mechanism such as belts, gears. Therefore, it is possible to drive the screw both in a plasticizing direction and in an injecting direction, and also to drive or move the screw in the axial direction during a plasticizing process.

The toggle type clamping device T includes: a fixed platen 11 which is fixedly provided on a bed B; a die clamping housing 12 which is provided on the bed B so as to move in the axial direction; four pieces of tie bars 13 which are provided between the fixed platen 11 and the die clamping housing 12; a movable platen 14 which can move in the axial direction and through which the tie bars 13 are passed; a toggle mechanism 20 which is provided between the die clamping housing 12 and the movable platen 14; and so on. The toggle mechanism 20 includes a pair of short links, a pair of long links, a cross head 21, and a pair of cross links. The cross head 21 is fitted to a tip end of a ball screw 22, and the ball screw 22 is passed through a through hole which is formed at a substantially center of the die clamping housing 12. A ball nut 23 is rotatably provided on the die clamping housing 12, and the ball screw 22 is screwed in the ball nut 23. Because the ball nut 23 is provided on the die clamping housing 12 so as not to move in the axial direction, when the ball nut 23 is driven to rotate, the ball screw 22 is driven to move in the axial direction, and the cross head 21 is moved in a die closing direction or in a die opening direction. The ball nut 23 is driven by a servo motor 24.

A fixed side die 15 is attached to the fixed platen 11 having the above-described structure, and a movable side die 16 is attached to the movable platen 14. A core projected from a parting line is formed in the fixed side die 15, and a recess having a predetermined size dented from the parting line is formed in the movable side die 16. A cavity for obtaining the molded product is formed by these core and recess.

Thermal medium passages for passing thermal medium such as water are formed in the fixed side die 15 and the movable side die 16. On the other hand, a die temperature regulating machine 30 is provided in association with these dies 15, 16. The die temperature regulating machine 30 includes a heat exchanger 31, a liquid feeding pump 32, an electromagnetic valve 33, a controller 34, and so on. The die temperature regulating machine 30 is connected to the thermal medium passage in the fixed side die 15 by way of a thermal medium supplying pipe 15a and a thermal medium returning pipe 15b. In the same manner, the die temperature regulating machine 30 is connected to the thermal medium passage in the movable side die 16 by way of a thermal medium supplying pipe 16a and a thermal medium returning pipe 16b. Therefore, during a warming up period before entering into a molding cycle, it is possible to heat up the dies 15, 16 to a predetermined temperature with the thermal medium such as warm water which is supplied from the die temperature regulating machine 30. In the molding cycle, the thermal medium is supplied to the fixed side die 15 and the movable side die 16 by the liquid feeding pump 32, thereby to cool the dies 15, 16 which have become high temperature, after the molten resin having high temperature (in other words, the high temperature molten resin) has been injected. Then, the thermal medium is circulated to the heat exchanger 31 and to the liquid feeding pump 32. The heat is indirectly exchanged between the thermal medium which is circulated in this manner and cold water which is supplied from a cold water supplying pipe 17. The warm water which has become high temperature after the heat exchange in the heat exchanger 31 is discharged from a warm water discharging pipe 18 to the exterior.

By the way, according to the first embodiment of the invention, a heat exchanger 35 for recovering the heat is interposed between the thermal medium returning pipes 15b, 16b. The heat recovered by the heat exchanger 35 is intended to preheat the resin material which is contained in the hopper 3, as described below. The heat exchanger 35 includes a first and second heat radiating pipes 36, 37, and a heat receiving pipe 38. These pipes 36 to 38 are in a form of a plate having a wide heat transmitting area or in a form of a meandering pipe, and provided with a plurality of fins on their surfaces. The thermal medium returning pipes 15b, 16b are respectively connected to the first and second heat radiating pipes 36, 37 having the above-described structure, and a hot air supplying pipe 40 formed of a heat insulating hose is connected to the heat receiving pipe 38.

As the thermal medium for conveying the heat which has been recovered by the heat exchanger 35 to the hopper 3, air which has a low heat capacity, and is excellent in heat responsive performance is used in this embodiment. Therefore, an air filter 41 is provided on a suction inlet of the hot air supplying pipe 40 thereby to suck in the atmospheric air. The hot air supplying pipe 40 is extended to the hopper 3 and formed as a preheating pipe 43 having a heat radiating structure. The preheating pipe 43 is wound around the outer periphery or the inner periphery of the hopper 3 by a plurality of windings, and continued to a suction blower 42. The suction blower 42 can control air exhausting ability.

Operation of the above-described first embodiment will be described. According to the embodiment, the heat exchanger 35 is simply interposed between the thermal medium returning pipes 15b, 16b. Therefore, in case where the heat exchanger 35 is kept in an inoperative state, for example, by stopping the suction blower 42, it is possible to mold the resin material without preheating. Then, an example of molding in which the resin material is preheated, after the molding cycle has started, will be described. The screw is driven to rotate by the driving part D, and the resin material in the hopper 3 is supplied to the injection cylinder 2 by a predetermined amount. The resin material is plasticized with the heat generated by the rotation of the screw, the heat added from the outer peripheral part of the injection cylinder 2, and so on. The screw retreats by the pressure of the resin resisting a back pressure, and the molten resin which has been plasticized is accumulated in a measuring chamber in front of the injection cylinder 2. On this occasion, the resin material has been preheated to 50° C., for example, and therefore, can be plasticized with small energy, as described above. The movable side die 16 is clamped with respect to the fixed side die 15 by means of the toggle mechanism 20. Then, the screw is driven in the axial direction, thereby to inject the molten resin material to be filled into the cavity which is formed between the dies 15, 16.

The liquid feeding pump 32, the electromagnetic valve 33 and so on in the die temperature regulating machine 30 are operated at a command of the controller 34, and the thermal medium is supplied to the fixed side die 15 and the movable side die 16 through the thermal medium supplying pipes 15a, 16a. The thermal medium which has cooled these dies 15, 16 and has become high temperature are returned to the heat exchanger 31 through the respective thermal medium returning pipes 15b, 16b. In the heat exchanger 31, the thermal medium is cooled with the cold water which is supplied from the exterior through the cold water supplying pipe 17, and returned to the liquid feeding pump 32. The cold water which has been supplied from the cold water supplying pipe 17 becomes high temperature, and is discharged to the exterior from the warm water discharging pipe 18. In this manner, the dies 15, 16 are cooled with the thermal medium which is supplied cyclically from the die temperature regulating machine 30 through the thermal medium supplying pipes 15a, 16a. Accordingly, the molten resin which has been injected to be filled into the cavity formed between the dies 15, 16 is cooled, and thus the molded product is obtained. When the temperature of the molten resin which has been filled is lowered to the predetermined temperature, the cooling process is finished. Then, by opening the movable side die 16, the molded product which has been solidified is taken out. During the above-described cooling process, and also, while the molded product is taken out, the resin material is plasticized, as described above, to be prepared for the next molding cycle.

While the molten resin is cooled via the dies 15, 16 as described above, the air is sucked into the hot air supplying pipe 40, by actuating the suction blower 42 or by switching a valve in a piping system which is not shown. Then, in the heat exchanger 35, the air is heated with the thermal medium having the high temperature which flows through the thermal medium returning pipes 15b, 16b. The air which has been heated will heat the hopper 3 from an inside or an outside. In this manner, the resin material in the hopper 3 is heated and dried. The air which has heated the resin material is exhausted to the atmospheric air from the suction blower 42.

According to the above-described first embodiment, the heat having relatively high temperature can be recovered, because the heat exchanger 35 is interposed between the thermal medium returning pipes 15b, 16b at an upstream side of the die temperature regulating machine 30.

Alternatively, as a second embodiment, the heat exchanger 35' may be provided in the warm water discharging pipe 18, at a position as shown by EX in FIG. 1, at a downstream side of the die temperature regulating machine 30. In the heat exchanger 35' according to the second embodiment, the air is heated with the warm water which flows through the warm water discharging pipe 18. The air which has been heated will heat the hopper 3 from an inside or an outside via the hot air supplying pipe 40.

Incidentally, although it has been so described that the air which has heated the hopper 3 is exhausted from the suction blower 42, it is also possible to return the air to the air filter 41.

Figure 2:
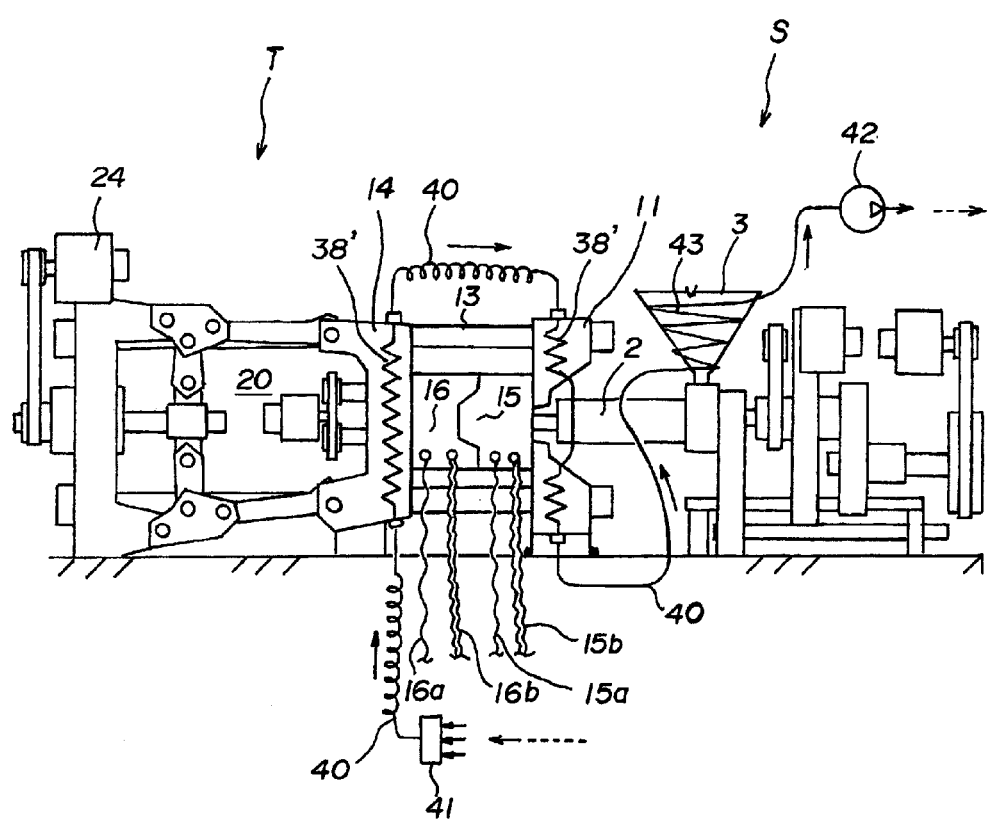
FIG. 2 is a front view showing an injection molding machine according to a third embodiment of the invention.

Referring to FIG. 2, a third embodiment of the invention will be described. In the first embodiment, the heat exchanger 35 is interposed between the thermal medium returning pipes 15b, 16b at an upstream side of the die temperature regulating machine 30. On the other hand, according to the third embodiment, the die temperature regulating machine 35 is not provided. Therefore, it is so designed that the heat transmitted to the fixed platen 11 from the fixed side die 15 and the heat transmitted to the movable platen 14 from the movable side die 16 are directly recovered so as to heat the hopper 3. Incidentally, components similar to those of the above-described first embodiment are denoted with the same reference numerals, and overlapped descriptions will be omitted. According to the third embodiment, the fixed platen 11 and the movable platen 14 are desirably formed of hollow material, and heat recovering passages 38', 38' having fins are provided inside the platens. The hot air supplying pipe 40 is connected to the heat recovering passages 38', 38' in series, to heat the resin material in the hopper 3. That is, in the third embodiment, the heat recovering passages 38', 38' functions as the heat exchanger 35 of the first embodiment. According to the third embodiment, an amount of distortion due to thermal expansion is reduced in the fixed platen 11 and the movable platen 14, because the temperatures of the fixed platen 11 and the movable platen 14 are lowered by recovering the heat by the heat recovering passages 38', 38'. Therefore, accurate molding can be attained.

Various modifications may be added to the third embodiment. For example, it is possible to utilize other thermal mediums besides the air. Moreover, it is possible to form through holes in the fixed platen 11 and the movable platen 14, and to insert pipes formed of copper or aluminum, which are excellent heat conductive material, respectively into these through holes in tight contact thereby to form the heat recovering passages 38', 38'. Further, it is possible to mount temperature sensors respectively on the fixed platen 11 and the movable platen 14, and to control rotation number of the suction blower 42 so that the temperature of the fixed platen 11 and the movable platen 14 measured by these sensors may be stabilized. As the results, thermal distortion is reduced, and more accurate molding can be attained. Still further, it is possible to provide the die temperature regulating machine 30 and the heat exchanger 35 in the same manner as in the first and second embodiments, and to recover the heat also from the fixed side die 15 and the movable side die 16. In this case, a main object to recover the heat from the heat recovering passages 38', 38' is to depress the thermal distortion due to a temperature change of the fixed platen 11 and the movable platen 14. Moreover, it is also possible to return the air which has heated the hopper 3 to the air filter 41. Further, it is also possible to recover the heat generated in a servo-amplifier, servo-motor, ball screw, etc. by the heat exchanger, although consumptive energy is small, as shown in Table 1.

What is claimed is:

1. A method of operating an injection molding machine, the injection molding machine comprising a die and an injection cylinder which plasticizes injection material and fills the die with the injection material, wherein the injection molding machine is operable to preheat the injection material and supply the preheated injection material to the injection cylinder by a predetermined amount to be plasticized, the method comprising:
    cooling the plasticized injection material in the die using a first thermal medium to solidify the plasticized injection material;
    heating a second thermal medium, through a first heat exchanger, from heat of the first thermal medium which has cooled the injection material filled in the die;
    cooling the first thermal medium, through a second heat exchanger downstream of the first heat exchanger, using a third thermal medium; and
    preheating the injection material using the second thermal medium.

2. The method of operating an injection molding machine according to claim 1, wherein the first heat exchanger exchanges heat between the first thermal medium for cooling the injection material and air as the second thermal medium for preheating the injection material.

3. A method of operating an injection molding machine, the injection molding machine comprising a die and an injection cylinder which plasticizes injection material and fills the die with the injection material, wherein the injection molding machine is operable to preheat the injection material and supply the preheated injection material to the injection cylinder by a predetermined amount to be plasticized, the method comprising:
    cooling the plasticized injection material in the die using a first thermal medium to solidify the plasticized injection material;
    heating a second thermal medium, through a first heat exchanger, from heat of the first thermal medium which has been supplied to the die from a die temperature regulating machine, cooled the injection material filled in the die so as to become high temperature and returned from the die;

cooling the first thermal medium returned from the die, through a second heat exchanger downstream of the first heat exchanger, using a third thermal medium; and preheating the injection material using the second thermal medium.

4. The method of operating an injection molding machine according to claim 3, wherein the first heat exchanger exchanges heat between the first thermal medium for cooling the injection material and air as the second thermal medium for preheating the injection material.

5. An injection molding machine comprising:

a die;

an injection cylinder which plasticizes injection material and fills the die with the plasticized injection material;

a thermal medium supplying pipe which supplies a first thermal medium to the die from a die temperature regulating machine;

a thermal medium returning pipe which discharges the first thermal medium from the die toward the die temperature regulating machine;

a hopper provided to the injection cylinder for containing the injection material;

a first heat exchanger provided to the thermal medium returning pipe for exchanging heat between the first thermal medium flowing through the thermal medium returning pipe and a second thermal medium flowing to the hopper for preheating the injection material contained in the hopper, whereby exhausted heat of the first thermal medium which has cooled the plasticized injection material filled in the die so as to become high temperature is shifted to the second thermal medium and preheats the injection material in the hopper; and a second heat exchanger downstream of the first heat exchanger that cools the first thermal medium using a third thermal medium.

6. The injection molding machine according to claim 5, wherein the first heat exchanger is provided in the thermal medium returning pipe between the die and the die temperature regulating machine and the second heat exchanger is provided in the die temperature regulating machine.

* * * * *